United States Patent
Park et al.

(10) Patent No.: US 8,274,371 B2
(45) Date of Patent: Sep. 25, 2012

(54) METHOD FOR MEASURING SPEED OF VEHICLE USING RFID, RFID READER FOR MEASURING SPEED OF VEHICLE, AND SYSTEM FOR COLLECTING VEHICLE INFORMATION USING THE SAME

(75) Inventors: Kyung Hwan Park, Daejeon (KR); Tae Young Kang, Seoul (KR); Seok Bong Hyun, Daejeon (KR); Sung Weon Kang, Daejeon (KR); Byoung Gun Choi, Daegu (KR); In Gi Lim, Daejeon (KR); Kyung Soo Kim, Daejeon (KR); Jung Bum Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 711 days.

(21) Appl. No.: 12/475,492

(22) Filed: May 30, 2009

(65) Prior Publication Data
US 2010/0123558 A1    May 20, 2010

(30) Foreign Application Priority Data
Nov. 20, 2008    (KR) .......................... 10-2008-0115921

(51) Int. Cl.
*G08B 21/00* (2006.01)
(52) U.S. Cl. ...... 340/10.4; 340/10.3; 340/441; 340/936; 340/572.4; 342/104
(58) Field of Classification Search ................ 340/10.3, 340/572.4, 441, 936; 342/104
See application file for complete search history.

(56) References Cited

U.S. PATENT DOCUMENTS

| 6,356,230 | B1 * | 3/2002 | Greef et al. .................. 342/127 |
| 2002/0024448 | A1 * | 2/2002 | Olesen .................... 340/825.49 |
| 2003/0080895 | A1 * | 5/2003 | Mertins et al. ................ 342/104 |
| 2004/0174294 | A1 * | 9/2004 | Arnold et al. ................ 342/104 |
| 2005/0285743 | A1 | 12/2005 | Weber |
| 2006/0279412 | A1 * | 12/2006 | Holland et al. ........... 340/10.51 |
| 2008/0061976 | A1 * | 3/2008 | Shafer ...................... 340/572.1 |
| 2008/0074273 | A1 | 3/2008 | Endo et al. |
| 2008/0150759 | A1 | 6/2008 | Ramasubbu |

FOREIGN PATENT DOCUMENTS

| JP | 2001-023086 | 1/2001 |
| JP | 2002-082166 | 3/2002 |
| KR | 1020060010600 A | 2/2006 |
| KR | 1020060073038 A | 6/2006 |
| KR | 1020070084837 A | 8/2007 |
| KR | 1020070104152 A | 10/2007 |
| KR | 1020070111174 A | 11/2007 |
| KR | 1020080045043 A | 5/2008 |

* cited by examiner

*Primary Examiner* — Jennifer Mehmood
*Assistant Examiner* — Mark Rushing

(57) ABSTRACT

A technique for simultaneously acquiring vehicle identification information and speed information of an RFID tag-attached vehicle by calculating the vehicle speed by using a Doppler shift value extracted from transmission and reception signals between the RFID tag and the RFID reader is disclosed. A method for measuring a vehicle speed by using an RFID reader installed right up on the road or at the roadside includes: transmitting a continuous wave; receiving a reflected wave with respect to the continuous wave from an RFID tag attached to a vehicle which has received the continuous wave; extracting a Doppler shift value from the continuous wave and the reflected wave; and calculating the speed of the vehicle by using the Doppler shift value.

8 Claims, 4 Drawing Sheets

METHOD FOR MEASURING SPEED OF VEHICLE USING RFID, RFID READER FOR MEASURING SPEED OF VEHICLE, AND SYSTEM FOR COLLECTING VEHICLE INFORMATION USING THE SAME

CROSS-REFERENCE TO RELATED APPLICATIONS

This application claims the priority of Korean Patent Application No. 2008-0115921 filed on Nov. 20, 2008, in the Korean Intellectual Property Office, the disclosure of which is incorporated herein by reference.

BACKGROUND OF THE INVENTION

1. Field of the Invention

The present invention relates to a method for measuring the speed of a vehicle using radio-frequency identification (RFID), an RFID reader for measuring the speed of a vehicle, and a system for collecting vehicle information using the same, and more particularly, to a technique for simultaneously acquiring vehicle identification information and speed information of an RFID tag-attached vehicle by calculating the vehicle speed by using a Doppler shift value extracted from transmission and reception signals between the RFID tag and the RFID reader.

2. Description of the Related Art

The related art vehicle information collecting system collects vehicle information mainly by using video devices such as traffic information collecting cameras, overspeed detection cameras, traffic monitoring CCTV systems, and the like.

However, in case of the collection of the vehicle information by using video devices, a huge amount of data must be stored, and a complicated data processing procedure must be performed in order to identify a vehicle by extracting a vehicle number from image data.

In addition, when a camera is used to identify a vehicle, image capturing is only possible in a narrow area in which the camera adjusts its sight, and it can be difficult to recognize vehicles in the fog, in bad weather, in the presence of obstacles and in the event of intentional license plate shielding and contamination. In addition, it is not possible to identify the vehicle if the vehicle is traveling at 255 kms per hour or faster because of limitations in the exposure speed of the camera.

Meanwhile, laser speed detectors, radiowave speed detectors, as well as detection loops and the like are also used as devices for measuring a vehicle speed. However, as they merely measure vehicle speed, while lacking the ability to identify the vehicle, these devices must accompany a video device such as a vehicle identification camera or the like.

Recently, a method for identifying an RFID tag-attached vehicle and measuring its speed by using an RFID reader has been proposed, but this method only allows the measurement of an average speed of a vehicle in a certain section, and it is not available for measuring the instantaneous speed of the vehicle.

SUMMARY OF THE INVENTION

An aspect of the present invention provides a method for measuring a vehicle speed using RFID, an RFID reader for measuring a vehicle speed, and a system for collecting vehicle information using the same, capable of simultaneously acquiring vehicle identification information and speed information of an RFID tag-attached vehicle by calculating the vehicle speed by using a Doppler shift value extracted from the transmission and reception signals between the RFID tag and the RFID reader.

According to an aspect of the present invention, there is provided a method for measuring a vehicle speed by using an RFID reader installed right up on the road or at the roadside, including: transmitting a continuous wave; receiving a reflected wave with respect to the continuous wave from an RFID tag attached to a vehicle which has received the continuous wave; extracting a Doppler shift value from the continuous wave and the reflected wave; and calculating the speed of the vehicle by using the Doppler shift value.

In extracting the Doppler shift value, the Doppler shift value may be extracted by calculating the difference between the frequency of the reflected wave and that of the continuous wave.

In calculating the vehicle speed, the vehicle speed may be calculated by Equation shown below:

$$v_0 = \frac{c}{2f_0} \cdot \frac{r}{\sqrt{r^2 - h^2}} \cdot \Delta f$$

According to another aspect of the present invention, there is provided an RFID reader including: a transmitting unit that has a transmitting antenna for radiating an RF signal, generates an RF signal to be transmitted to an RFID tag attached to a vehicle, transmits the generated RF signal via the transmitting antenna, and transfers the frequency of the transmitted RF signal to a Doppler shift extracting unit; a receiving unit that has a receiving antenna for receiving a reflected wave from the RFID tag, extracts reception data included in the received reflected wave, transfers the extracted reception data to a controller, and transfers the frequency of the received reflected wave to the Doppler shift extracting unit; a frequency synthesizing unit that synthesizes the frequency of a band to be used for RFID communication between the RFID tag and the RFID reader and supplies the synthesized frequency to the transmitting unit and the receiving unit under the control of the controller; the Doppler shift extracting unit that compares the frequency of the transmitted RF signal transferred from the transmitting unit and the frequency of the reflected wave transferred from the receiving unit to extract a Doppler shift value; a vehicle speed calculating unit that calculates a vehicle speed by using the frequency and angle information of the transmitted RF signal transferred from the controller and the Doppler shift value transferred from the Doppler shift extracting unit; and the controller that controls the respective elements of the RFID reader to perform communication with the RFID tag and calculate the vehicle speed.

The transmitting unit may generate the RF signal to be transmitted to the RFID tag by using the transmission data transferred from the controller and the synthesized frequency transferred from the frequency synthesizing unit.

The reception data included in the received reflected wave may include information about the RFID tag-attached vehicle which is information embedded in the RFID tag.

The Doppler shift extracting unit may output the Doppler shift value in the form of voltage or current.

The angle information may refer to an angle between a straight line formed by connecting the RFID reader and the RFID tag with a straight line indicating a traveling (running) direction of the RFID tag-attached vehicle.

The vehicle speed calculating unit may calculate the vehicle speed by Equation shown below:

$$v_0 = \frac{c}{2f_0} \cdot \frac{r}{\sqrt{r^2 - h^2}} \cdot \Delta f$$

The controller may generate a vehicle information package including the reception data transferred from the receiving unit and the vehicle speed transferred from the vehicle speed calculating unit.

According to another aspect of the present invention, there is provided a system for collecting vehicle information, including: an RFID reader that performs RFID communication with an RFID tag attached to a running vehicle to acquire information about the vehicle embedded in the RFID tag, calculates a vehicle speed by using a Doppler shift value, generates a vehicle information package including information about the vehicle and vehicle speed information, and transmits the vehicle information package to a central control server; and the central control server that receives the vehicle information package from the RFID reader, and collects, processes, and analyzes the received data.

The RFID reader may extract the Doppler shift value by comparing a transmission frequency and a reception frequency, and calculate the vehicle speed by using the Equation shown below:

$$v_0 = \frac{c}{2f_0} \cdot \frac{r}{\sqrt{r^2 - h^2}} \cdot \Delta f$$

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
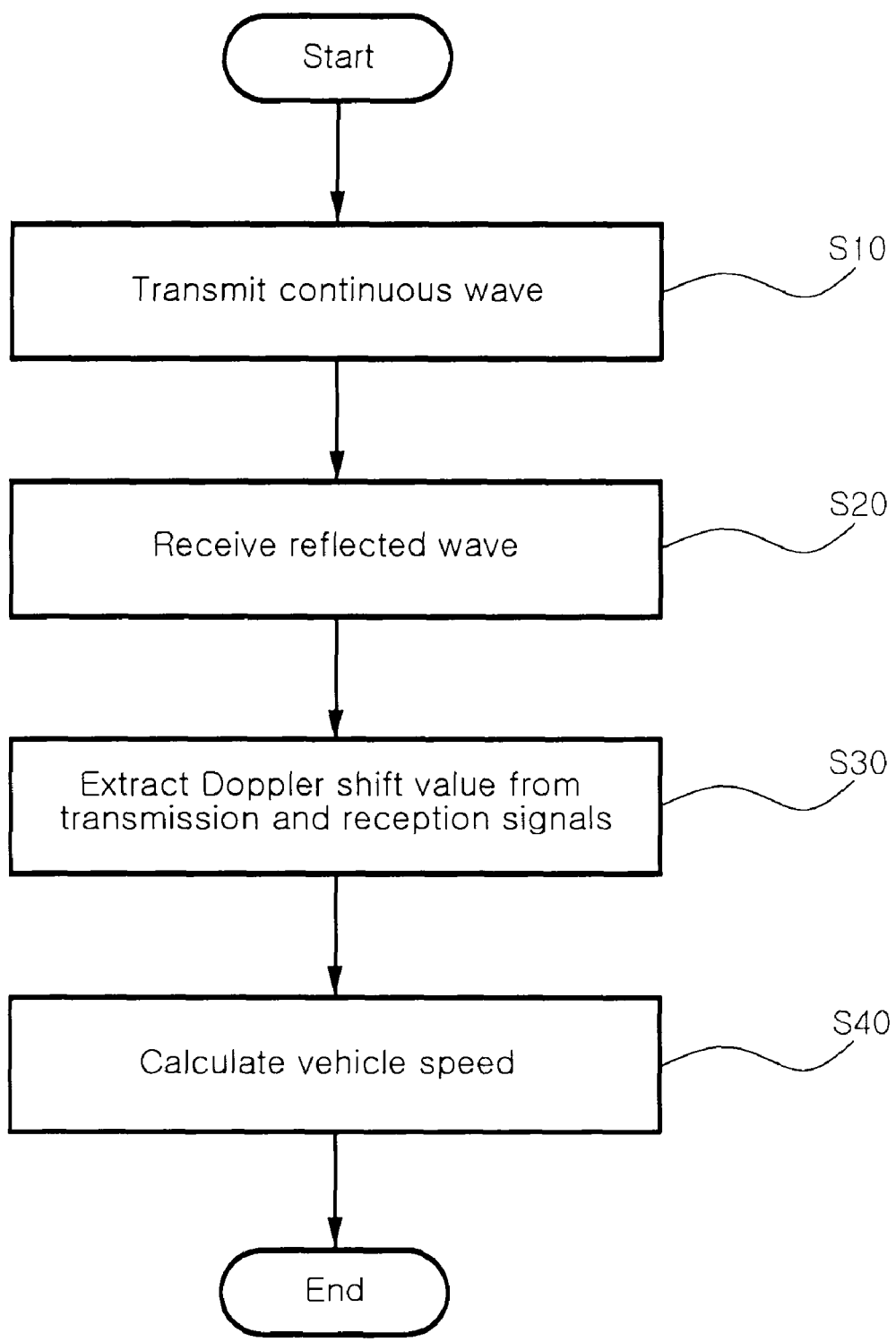
FIG. 1 is a flow chart illustrating the process of measuring a vehicle speed using RFID according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

In RFID communication, an RFID reader and an RFID tag use the same frequency. While the RFID reader is transmitting a modulated RF signal, the RFID tag receives the modulated RF signal and simply performs a command from the RFID reader without responding thereto.

When the RFID reader transmits a continuous wave (CW) (i.e., nonmodulated signal), the RFID tag responds thereto such that the RFID tag changes a reflection coefficient with respect to the incident signal to include information embedded in the RFID tag in a reflected wave and transmit the same. In this case, the RFID reader receives the reflected wave of the same frequency at the same time when it transmits the CW.

However, if the distance between the RFID tag and the RFID reader is decreased or increased at a fast speed, a Doppler effect occurs to make the frequencies of the incident wave and the reflected wave of the RFID tag different. Namely, at the side of the RFID reader, there is a frequency difference between a transmission signal and a reception signal, which is called a Doppler shift.

In the present invention, a vehicle speed is measured by using the Doppler shift value in RFID communications.

FIG. 1 is a flow chart illustrating the process of measuring a vehicle speed using RFID according to an exemplary embodiment of the present invention. Measurement of a vehicle speed is performed by using an RFID tag attached to a vehicle and an RFID reader installed right up on the road or at the roadside.

First, the RFID reader transmits a continuous wave (CW) (i.e., a nonmodulated signal) (S10), and receives a reflected wave from the RFID tag which has received the CW, in response to the CW (S20).

Then, the RFID reader calculates a frequency difference between the transmission and reception signals to extract a Doppler shift value (S30), and then calculates an instantaneous speed of the vehicle by using the Doppler shift value (S40).

The method of calculating the instantaneous speed of the vehicle by using the Doppler shift value will be described later in detail with reference to FIGS. 3A and 3B.

Figure 2:
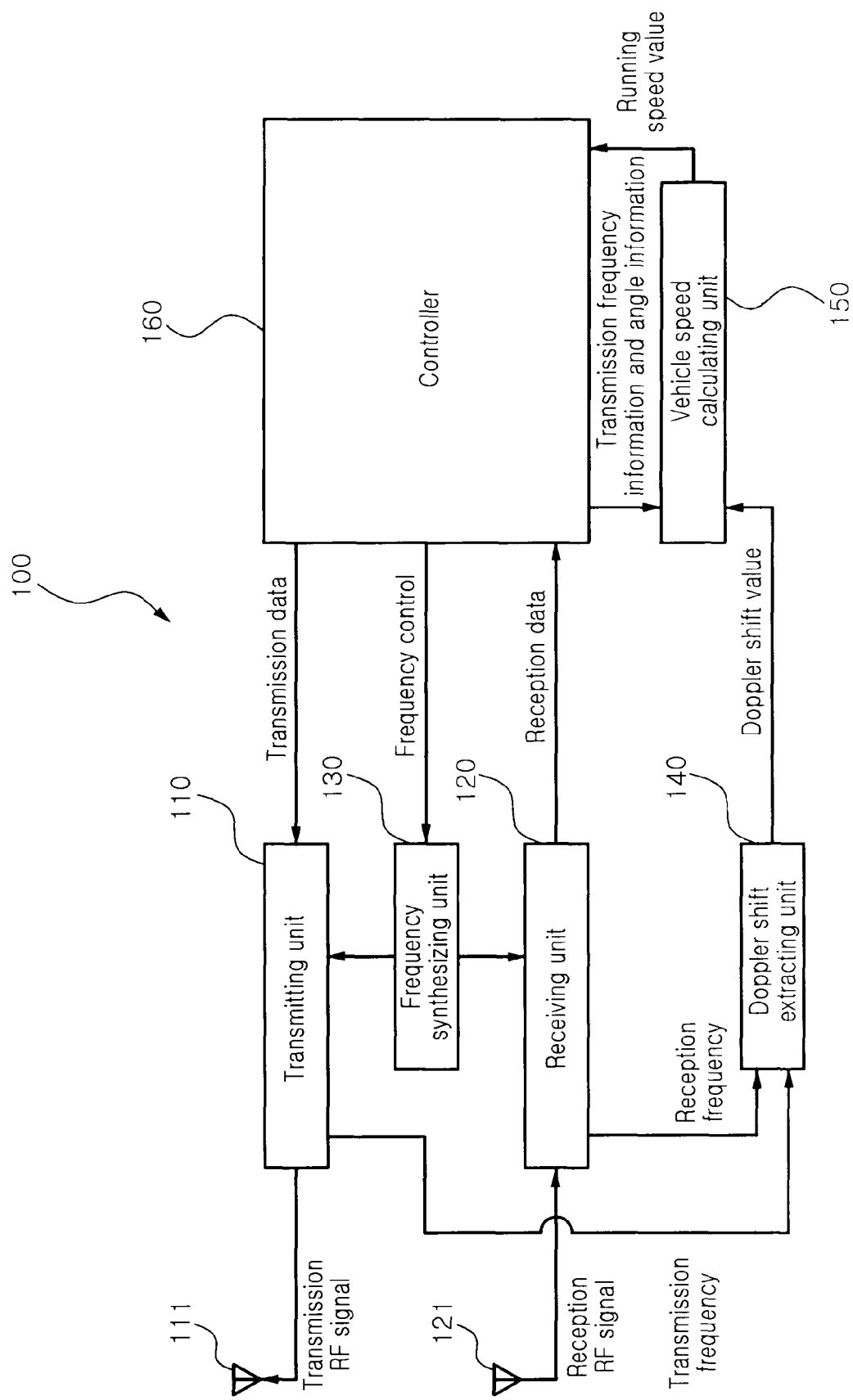
FIG. 2 is a schematic block diagram of an RFID reader for measuring a vehicle speed according to an exemplary embodiment of the present invention.

FIG. 2 is a schematic block diagram of an RFID reader for measuring a vehicle speed according to an exemplary embodiment of the present invention. The RFID reader 100 includes a transmitting unit 110, a receiving unit 120, a frequency synthesizing unit 130, a Doppler shift extracting unit 140, a vehicle speed calculating unit 150, and a controller 160.

The transmitting unit 110 includes a transmitting antenna 111 for radiating an RF signal. The transmitting unit 110 generates an RF signal, i.e., a CW, to be transmitted to the RFID tag by using transmission data received from the controller 160 and synthesized frequency received from the frequency synthesizing unit 130, and transmits the generated signal via the transmitting antenna 111. In addition, the transmitting unit 110 transfers the frequency of the transmission RF signal to the Doppler shift extracting unit 140.

The receiving unit 120 includes a receiving antenna 121 for receiving a reflected wave from the RFID tag. The receiving unit 120 changes the received RF signal into a baseband signal, extracts reception data included in the reception RF signal, transfers it to the controller 160, and transfers the frequency of the reception RF signal to the Doppler shift extracting unit 140. The reception data included in the reception RF signal is information embedded in the RFID tag, which includes information about the vehicle with the RFID tag applied thereto, e.g., information such as the vehicle registration number, the make and model of the vehicle, the owner of the vehicle, and the like.

The frequency synthesizing unit 130 synthesizes a frequency of a band desired to be used for RFID communication between the RFIG tag and the RFID reader 100 and supplies the same to the transmitting unit 110 and the receiving unit 120 under the control of the controller 160.

The Doppler shift extracting unit 140 receives the frequency (transmission frequency) of the transmission RF signal from the transmitting unit 110 and the frequency (reception frequency) of the reception RF signal from the receiving unit 120, compares the transmission frequency and the reception frequency to calculate the difference to extract a Doppler shift value, and outputs the extracted Doppler shift value in the form of voltage or current.

The vehicle speed calculating unit 150 calculates an instantaneous speed of the vehicle by using the transmission frequency information and angle information received from the controller 160 and the Doppler shift value received from the Doppler shift extracting unit 140, and transfers a vehicle speed to the controller 160. The angle information refers to an angle (indicated as θ in FIGS. 3A and 3B) between a straight line formed by connecting the RFID reader 100 and the RFID tag and a straight line indicating the running (i.e., traveling) direction of the RFID tag-applied vehicle. The method of calculating the vehicle speed by the vehicle speed calculating unit 150 will be described later with reference to FIGS. 3A and 3B.

The controller 160 controls the respective elements of the RFID reader 100 to perform communication with the RFID tag applied to the vehicle and calculate the vehicle speed. In detail, the controller 160 transfers transmission data desired to be transmitted to the RFID tag to the transmitting unit 110, and controls the frequency synthesizing unit 130 to synthesize the frequency to be used for RFID communication. In addition, the controller 160 transfers the transmission frequency information and angle information to the vehicle speed calculating unit 150, for the purpose of calculating the vehicle speed.

In addition, the controller 160 may receive the reception data, i.e., the information about the vehicle, included in the reception RF signal from the receiving unit 120, and receive the vehicle speed from the vehicle speed calculating unit 150, to generate vehicle information package (including the information about the vehicle and the vehicle speed information) with respect to each of RFID tag-applied vehicles. In addition, the controller 160 may communicate with an external server (not shown) via a communications network such as the Internet and the like to transmit the vehicle information package to the external server.

Figure 3A:
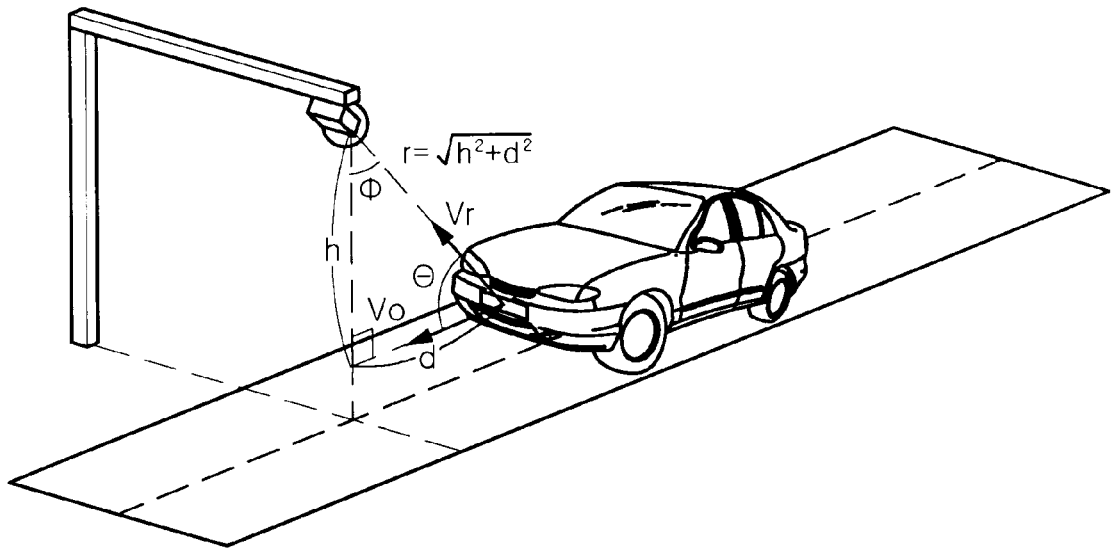
FIGS. 3A and 3B are conceptual views illustrating a method for calculating a vehicle speed by using a Doppler shift value.
Figure 3B:
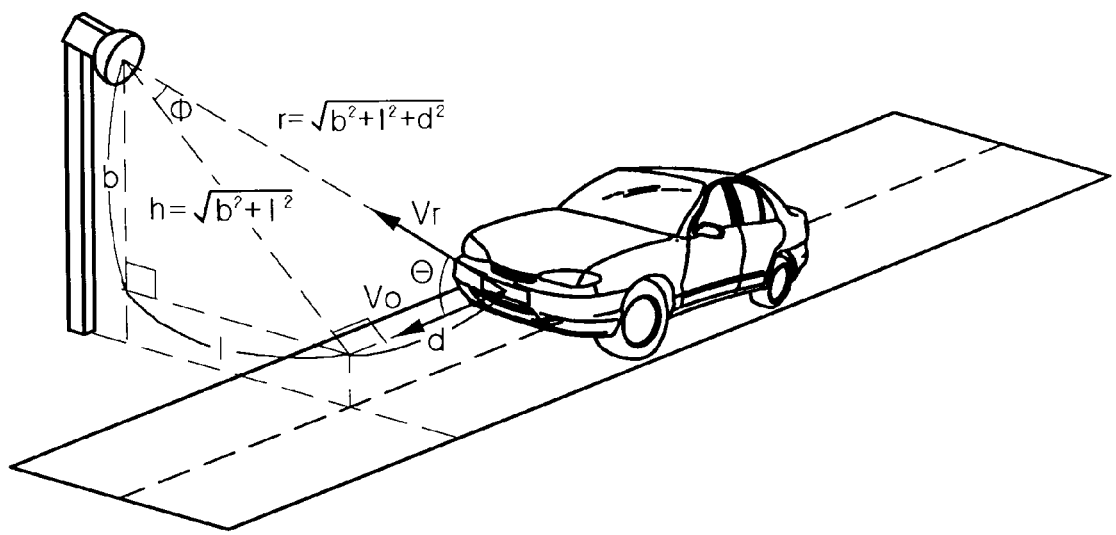

FIGS. 3A and 3B are conceptual views illustrating a method for calculating a vehicle speed by using a Doppler shift value. Specifically, FIG. 3A illustrates the case where the RFID reader is installed right up on the road, and FIG. 3B illustrates the case where the RFID reader is installed at the roadside.

In case of calculating a vehicle speed by using a Doppler shift value according to an exemplary embodiment of the present invention, in order to obtain the speed with respect to a running direction of the vehicle, the angle (θ) between the straight line formed by connecting the RFID reader and the RFID tag and the straight line indicating the running direction of the RFID tag-applied vehicle should be considered.

First, the distance in a straight line (r) between the RFID reader and the RFID tag applied to the vehicle may be represented by Equation 1 shown below. In this case, $r_0$ is the distance in a straight line between the RFID reader and the RFID tag at the moment the Doppler shift value is measured, and $v_r$ is the vehicle speed on the straight line formed by connecting the RFID reader and the RFID tag.

$$r = r_0 - v_r t \qquad \text{[Equation 1]}$$

Meanwhile, if a signal (s(t,r)) received by the RFID tag attached to the vehicle is represented by Equation 2 shown below, the frequency $(f_1)$ of the signal received by the RFID tag may be represented by Equation 3 shown below. In this case, f0 is the transmission frequency of the RFID reader, $k = 2\pi/\lambda_0$ is the wave number, $\lambda_0 = c/f_0$ is a wavelength, and 'c' is a signal propagation speed (around $3 \times 10^8$ m/s)

$$s(t, r) = \cos(2\pi f_0 t - kr) \qquad \text{[Equation 2]}$$
$$= \cos(2\pi f_0 t - kr_0 + kv_r t)$$

$$f_1 = \frac{1}{2\pi} \frac{\partial (2\pi f_0 t - kr_0 + kv_r t)}{\partial t} \qquad \text{[Equation 3]}$$
$$= \frac{1}{2\pi}(2\pi f_0 + kv_r)$$
$$= f_0 + \frac{v_r}{\lambda_0}$$

When the reception signal at the RFID tag is reflected to return to the RFID reader, the frequency $(f_2)$ of the signal received by the RFID reader may be represented by Equation 4 shown below, likewise as in the case of Equation 3:

$$f_2 = f_1 + \frac{v_r}{\lambda_1} \qquad \text{[Equation 4]}$$
$$= \left|f_0 + \frac{v_r}{\lambda_0}\right| + \frac{v_r}{\lambda_1}$$
$$\approx f_0 + 2\frac{v_r}{\lambda_0} \leftarrow (\lambda_0 \approx \lambda_1)$$

Meanwhile, in order to obtain the speed $(v_0)$ with respect to the running direction of the vehicle, the angle (θ) between the straight line connecting the RFID reader and the RFID tag and the straight line indicating the running direction of the RFID tag-attached vehicle should be known.

Because the height (h) of the RFID reader is predetermined, if the distance in straight line between the RFID reader and the RFID tag is obtained, the angle (θ) could be calculated by Equation 5 shown below:

$$\cos\theta = \frac{\sqrt{r^2 - h^2}}{r} \qquad \text{[Equation 5]}$$

The transmission RF signal of the RFID reader includes a synchronization signal, and a portion of the synchronization signal is also reflected to return to the RFID reader. Thus, 'r' may be predicted by Equation 6 shown below by using time (τ) taken for the synchronization signal, which has been transmitted from the RFID reader, to return, and accordingly, the angle (θ) can be also calculated.

$$r = \frac{c\tau}{2} \quad \text{[Equation 6]}$$

In the RFID reader, the Doppler shift value (Δf) may be expressed by the difference between the reception frequency and the transmission frequency as represented by Equation 7 shown below, and accordingly, the vehicle speed ($v_0$) may be represented by Equation 8 shown below:

$$\Delta f \triangleq f_2 - f_0 \quad \text{[Equation 7]}$$
$$= \frac{2}{\lambda_0} \cdot v_r$$
$$= \frac{2f_0}{c} \cdot v_0 \frac{\sqrt{r^2 - h^2}}{r}$$

$$v_0 = \frac{c}{2f_0} \cdot \frac{r}{\sqrt{r^2 - h^2}} \cdot \Delta f \quad \text{[Equation 8]}$$

Through the processes as described above, the instantaneous speed of the vehicle with the RFID tag attached thereto can be measured.

Figure 4:
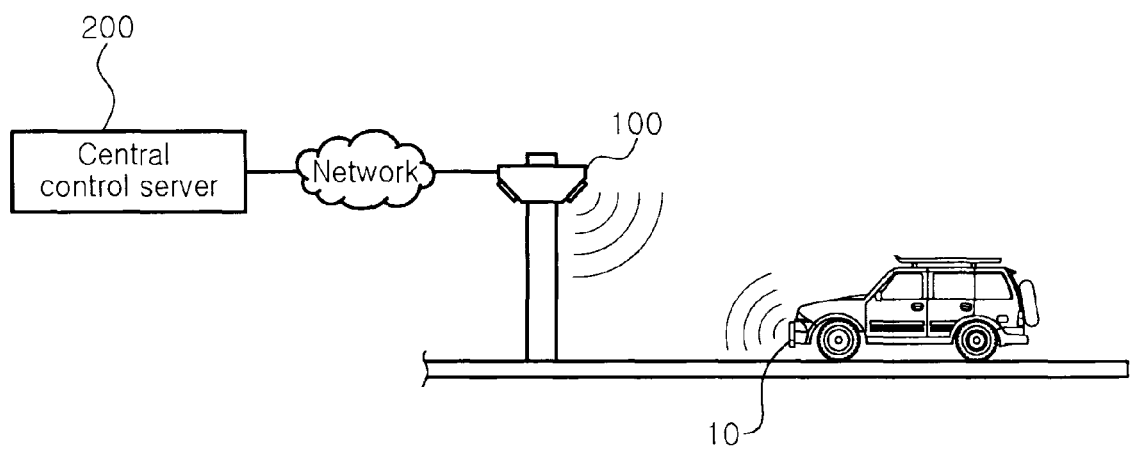
FIG. 4 illustrates the configuration of a vehicle information collecting system according to an exemplary embodiment of the present invention.

FIG. 4 illustrates the configuration of a vehicle information collecting system according to an exemplary embodiment of the present invention. The vehicle information collecting system includes the RFID reader 100 and a central control server 200. The RFID reader 100 and the central control server 200 are connected via a network and transmit and receive data to and from each other.

The RFID reader 100 installed right up on the road or at the roadside communicates with the RFID tag 10 attached to the moving vehicle to acquire information about the vehicle embedded in the RFID tag 10 and measure the vehicle speed by using a Doppler shift value. In addition, the RFID reader 100 generates a vehicle information package including the information about the vehicle (e.g., vehicle identification information such as the vehicle registration number, the make and model of the vehicle, the owner of the vehicle, etc.) and the vehicle speed, and transmits the generated vehicle information package to the central control server 200.

The central control server 200 receives the vehicle information package from the RFID reader 100 and collects, processes, and analyzes the received data to provide diverse services such as overspeed detection, escape (fleeing) vehicle tracking, stolen vehicle monitoring, and the like.

As set forth above, according to exemplary embodiments of the invention, a vehicle can be identified and an instantaneous speed of the vehicle can be measured by using only the RFID reader and the RFID tag attached to the vehicle. In addition, because there is no need to process image data for vehicle identification, the information processing speed can become faster and data to be stored can be significantly reduced. Also, it is possible to measure an overspeed vehicle at 300 km per hour or faster.

Moreover, because vehicles within an RFID communication area can be simultaneously identified, even more effective and faster traffic information system than in the case of using the conventional traffic information collecting camera or traffic monitoring CCTV can be constructed.

The RFID reader according to the embodiments of the present invention can be utilized for systems of multiple purposes such as a traffic information network, escape vehicle tracking, anti-terror purposes, and the like, as well as for a vehicle information collecting system.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for measuring a vehicle speed by using an RFID reader installed on a road or on a roadside, the method comprising:
   transmitting a continuous wave;
   receiving a reflected wave with respect to the continuous wave from an RFID tag attached to a vehicle which has received the continuous wave;
   extracting a Doppler shift value from the continuous wave and the reflected wave; and
   calculating the speed of the vehicle by using the Doppler shift value,
   wherein, in calculating the vehicle speed, the vehicle speed is calculated by the equation shown below:

$$v_0 = \frac{c}{2f_0} \cdot \frac{r}{\sqrt{r^2 - h^2}} \cdot \Delta f$$

wherein v0 is a vehicle speed, 'c' is a signal propagation speed, f0 is the transmission frequency of the RFID reader, 'r' is the distance in straight line between the RFID reader and the RFID tag, 'h' is the height of the RFID reader, and Δf is the Doppler shift value.

2. An RFID reader comprising:
   a transmitting unit that has a transmitting antenna configured to radiate an RF signal, generate an RF signal to be transmitted to an RFID tag attached to a vehicle, transmit the generated RF signal via the transmitting antenna, and transfer the frequency of the transmitted RF signal to a Doppler shift extracting unit;
   a receiving unit that has a receiving antenna configured to receive a reflected wave from the RFID tag, extract reception data included in the received reflected wave, transfer the extracted reception data to a controller, and transfer the frequency of the received reflected wave to the Doppler shift extracting unit;
   a frequency synthesizing unit configured to synthesize the frequency of a band to be used for RFID communication between the RFID tag and the RFID reader and supply the synthesized frequency to the transmitting unit and the receiving unit under the control of the controller;
   the Doppler shift extracting unit configured to compare the frequency of the transmitted RF signal transferred from the transmitting unit and the frequency of the reflected wave transferred from the receiving unit to extract a Doppler shift value;
   a vehicle speed calculating unit configured to calculate a vehicle speed by using the frequency of the transmitted RF signal and angle information transferred from the controller and the Doppler shift value transferred from the Doppler shift extracting unit; and
   the controller configured to control the respective elements of the RFID reader to perform communication with the RFID tag and calculate the vehicle speed,
   wherein the vehicle speed calculating unit calculates the vehicle speed by Equation shown below:

$$v_0 = \frac{c}{2f_0} \cdot \frac{r}{\sqrt{r^2 - h^2}} \cdot \Delta f$$

wherein v0 is a vehicle speed, 'c' is a signal propagation speed, f0 is the transmission frequency of the RFID reader, 'r' is the distance in straight line between the RFID reader and the RFID tag, 'h' is the height of the RFID reader, and Δf is the Doppler shift value.

3. The RFID reader of claim 2, wherein the transmitting unit generates the RF signal to be transmitted to the RFID tag by using the transmission data transferred from the controller and the synthesized frequency transferred from the frequency synthesizing unit.

4. The RFID reader of claim 2, wherein the reception data included in the received reflected wave comprises information about the RFID tag-attached vehicle which is information embedded in the RFID tag.

5. The RFID reader of claim 2, wherein the Doppler shift extracting unit outputs the Doppler shift value in the form of voltage or current.

6. The RFID reader of claim 2, wherein the angle information is an angle between a straight line formed by connecting the RFID reader and the RFID tag and a straight line indicating a running direction of the RFID tag-attached vehicle.

7. The RFID reader of claim 2, wherein the controller generates a vehicle information package including the reception data transferred from the receiving unit and the vehicle speed transferred from the vehicle speed calculating unit.

8. A system for collecting vehicle information, the system comprising:
- an RFID reader configured to perform RFID communication with an RFID tag attached to a running vehicle to acquire information about the vehicle embedded in the RFID tag, calculate a vehicle speed by using a Doppler shift value, generate a vehicle information package including information about the vehicle and vehicle speed information, and transmit the vehicle information package to a central control server; and
- the central control server configured to receive the vehicle information package from the RFID reader, and collect, process, and analyze the received data, wherein the RFID reader calculates the vehicle speed by using Equation shown below:

$$v_0 = \frac{c}{2f_0} \cdot \frac{r}{\sqrt{r^2 - h^2}} \cdot \Delta f$$

wherein v0 is a vehicle speed, 'c' is a signal propagation speed, f0 is the transmission frequency of the RFID reader, 'r' is the distance in straight line between the RFID reader and the RFID tag, 'h' is the height of the RFID reader, and Δf is the Doppler shift value.

* * * * *